United States Patent [19]

Koksbang

[11] Patent Number: 5,366,830
[45] Date of Patent: Nov. 22, 1994

[54] VANADIUM OXIDE CATHODE ACTIVE MATERIAL AND METHOD OF MAKING SAME

[75] Inventor: Rene Koksbang, San Jose, Calif.

[73] Assignee: Valence Technology, Inc., San Jose, Calif.

[21] Appl. No.: 16,962

[22] Filed: Feb. 12, 1993

[51] Int. Cl.$^5$ .............................................. H01M 4/02
[52] U.S. Cl. ................... 429/218; 429/191; 429/192; 205/50; 205/57
[58] Field of Search ............... 429/191, 192, 218; 205/50, 57

[56] References Cited

U.S. PATENT DOCUMENTS

| | | | |
|---|---|---|---|
| 4,675,260 | 6/1987 | Sakurai et al. | 429/191 |
| 5,039,582 | 8/1991 | Pistoia | 429/218 |
| 5,079,109 | 1/1992 | Takami et al. | 429/197 |
| 5,114,809 | 5/1992 | Nakacho et al. | 429/192 |
| 5,153,082 | 10/1992 | Ogino et al. | 429/194 |
| 5,219,677 | 6/1993 | Labat et al. | 429/50 |
| 5,219,681 | 6/1993 | Yamada et al. | 429/192 |

OTHER PUBLICATIONS

Gabano, "Lithium Batteries" pp: 266–268 (month N/A).
Venkatasetty, "Lithium Battery Technology" 1984 pp: 66–67 (month N/A).

*Primary Examiner*—Stephen Kalafut
*Assistant Examiner*—M. Nuzzolillo
*Attorney, Agent, or Firm*—Linda M. Deschere

[57] ABSTRACT

The present invention provides a lithium battery comprising a cathode active material having as its major component amorphous $V_2O_5$. The amorphous $V_2O_5$ is prepared by electrochemically reacting crystalline vanadium pentoxide ($V_2O_5$) with lithium in a cell to a voltage sufficient to transform crystalline vanadium pentoxide to amorphous vanadium pentoxide. Preferably, the electrochemical reaction is conducted in a $V_2O_5$—Li cell of about 1.5 V at a relatively constant current in a range of about 0.05 milliamps per cm$^2$ to about 0.5 milliamps per cm$^2$.

22 Claims, 2 Drawing Sheets

VANADIUM OXIDE CATHODE ACTIVE MATERIAL AND METHOD OF MAKING SAME

FIELD OF THE INVENTION

This invention relates to electrochemical batteries and more particularly to improved positive electrode active material mainly composed of vanadium pentoxide ($V_2O_5$).

BACKGROUND OF THE INVENTION

The basic components of an $Li/V_xO_y$ cell include a lithium anode, a separator, and a vanadium oxide cathode. The cathode is usually composed of an oxide of vanadium, such as vanadium pentoxide ($V_2O_5$), and other components such as graphite and an electrolyte/binder.

During cell operation, incorporation of lithium in $V_2O_5$ occurs. It is known that the $Li/V_2O_5$ system heretofore in use has a multi-plateau discharge characteristic. $Li/V_2O_5$ cells are known to have as many as 3 voltage steps above 2.0 volts. Gross plateaus appear at about 3.2 V, 2.4 V, and 2.1 to 2.2 V.

The relatively abrupt drop from about 3.0 volts to less than about 2.4 volts presents a major inconvenience for many electronic applications. Furthermore, it is known that the rechargeability of the $Li/V_2O_5$ system is very sensitive to the lower voltage limit. If the battery is discharged to about 2.2 volts, the battery is practically impossible to recharge.

In U.S. Pat. No. 4,675,260, Sakurai et al describes binary and ternary cathode active materials of $V_2O_5$ with at least one of $P_2O_5$, $TeO_2$, $GeO_2$, $Sb_2O_3$, $Bi_2O_3$ and $B_2O_3$ and/or at least one metal oxide selected from the group consisting of $MoO_3$ and $WO_3$. Precursors of such binary and ternary products are heated to a melt and rapid quenched. The discharge profiles of such binary and ternary products contain significant plateaus which indicates that such products still possess some order and are not fully amorphous.

What is needed is a new cathode active material based on $V_2O_5$, in a form which maintains its capacity and has good charge/discharge characteristics. What is also needed is a method to form such $V_2O_5$-based materials.

SUMMARY OF THE INVENTION

It is an object of the invention to provide a new cathode (positive electrode) $V_2O_5$-based active material for a lithium battery. Another object is to provide a method of making the new cathode material and the battery containing such cathode material. It is also an object to provide a lithium battery having a cathode active material containing an amorphous oxide of $V_2O_5$, formed in situ. Another object is to provide a lithium battery having good charge and discharge capacity.

The present invention provides a lithium battery comprising a cathode active material having as its major component an amorphous $V_2O_5$ vanadium pentoxide, which is lithiated amorphous vanadium pentoxide ($Li_xV_2O_5$). Preferably, the active material consists essentially of lithiated amorphous vanadium pentoxide ($Li_xV_2O_5$). The amorphous $V_2O_5$-based material is prepared by electrochemically reacting crystalline vanadium pentoxide ($V_2O_5$) with lithium in a cell to a voltage sufficient to achieve the inclusion of more than two moles equivalent of lithium for each mole equivalent of the vanadium pentoxide. A suitable voltage is below about 2.0 V, desirably, a voltage of about 1.8 V or less and, preferably, a voltage of about 1.5 V or less.

Suitable voltage levels are in a range of about 1.5 V to about 2.0 V and, preferably, in a range of about 1.5 V to about 1.8 V. Preferably, the electrochemical reaction is conducted in a cell to a voltage in the range of about 1.5 V to about 1.8 V in a $V_2O_5$—Li cell at about room temperature and at a relatively constant current density. A suitable current density is less than 1 milliamp per $cm^2$ and, desirably, in a range of about 0.05 milliamps per $cm^2$ to about 0.5 milliamps per $cm^2$.

Preferably, the amorphous $V_2O_5$-based active material is prepared in, and used in, cells with an anode active material made of lithium or an alloy or a compound which includes lithium. The cells also include an electrolyte which is chemically stable with respect to the cathode active material ($V_2O_5$) and lithium and which allows lithium ions to move therethrough to react electro-chemically with the cathode active material ($V_2O_5$) of the invention.

A preferred lithium cell comprises the positive electrode of the invention, a negative electrode which is metallic lithium, and an electrolyte which is a solid electrolyte or electrolyte separator in the form of a polymeric network containing an electrolyte solution comprising a metal salt of lithium.

Advantageously, the method of the invention forms the amorphous vanadium pentoxide ($V_2O_5$) in situ. Thus, the components of the cell are assembled once, the transformation of $V_2O_5$ to an amorphous state is accomplished by the process of the invention, and then the cell is ready for use. For such in situ formation, the anode must contain both an amount of lithium needed in the battery (cell) during normal use and an additional amount corresponding to lithium needed for transformation of crystalline $V_2O_5$ to amorphous $V_2O_5$ and/or lithiated amorphous $V_2O_5$ ($Li_xV_2O_5$).

These and other objects, features and advantages will become apparent from the following description of the preferred embodiments, appended claims and accompanying drawings.

DETAILED DESCRIPTION OF THE PREFERRED EMBODIMENTS

Figure 1:
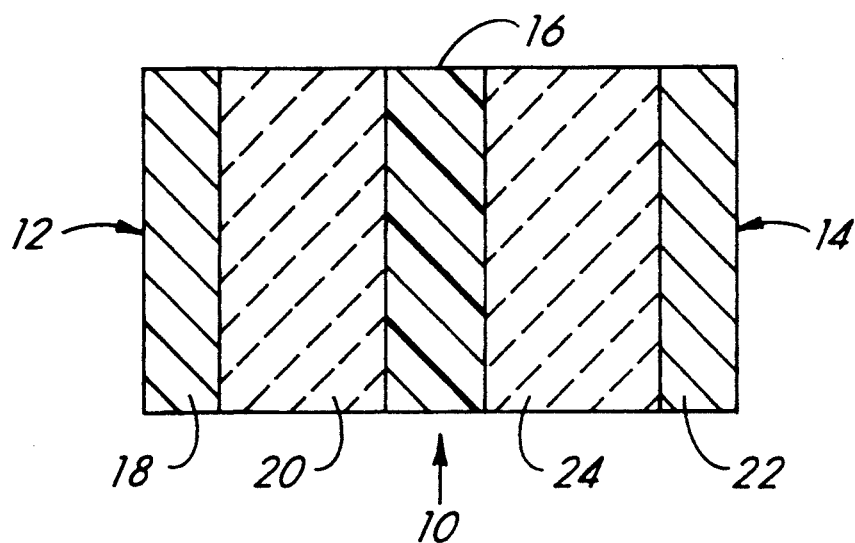
FIG. 1 is an illustration of a cross-section of a lithium battery or cell embodying the invention.

As shown in FIG. 1, an electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes a current collector 18, typically of nickel, iron, stainless steel, and/or copper foil, and a body of negative electrode active material 20 made of lithium or an alloy of lithium or a compound which includes lithium.

The negative electrode active material 20 is sometimes simply referred to as the negative electrode. The positive electrode side includes a current collector 22, typically of aluminum, nickel, iron, stainless steel, and/or copper foil, and such foils having a protective conducting coating or foil, and a body of positive electrode active material 24 which has as its main component $V_2O_5$. The positive electrode active material 24 is sometimes simply referred to as the positive electrode. The separator 16 is typically a solid (polymer) electrolyte, electrolyte separator. A suitable electrolyte separator (metal salt/polymeric material separator) is described in U.S. Pat. No. 4,830,939, and is a solid organic polymer matrix containing an ionically conducting liquid with an alkali metal salt and the liquid is an aprotic polar solvent. Typical separator materials also include glass, cellulose and polymers such as PVC which separate electrodes and permit migration of electrolyte components. A lithium battery must be non-aqueous, thus electrolyte components include a lithium metal salt and aprotic solvent.

Figure 2:
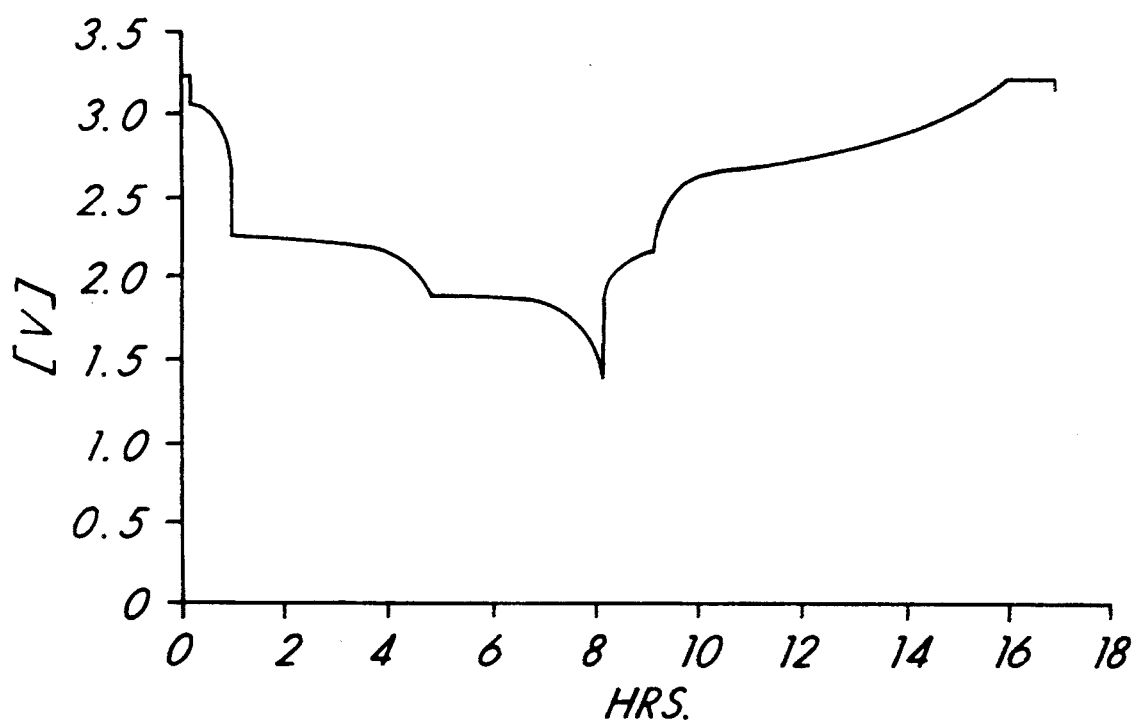
FIG. 2 is a voltage curve of the first discharge of a conventional crystalline $V_2O_5$ and lithium battery.

As mentioned, the rechargeability of a lithium battery may be limited by the cyclability of the cathode (positive electrode) active material. In the case of batteries heretofore in use employing crystalline $V_2O_5$ during cell operation, incorporation of lithium in $V_2O_5$ occurs. More particularly, as shown in FIG. 2, it is known that this system has a multi-plateau discharge characteristic. $Li/V_2O_5$ cells are known to have as many as 3 voltage steps above 2.0 volts. Gross plateaus appear at about 3.2 V, 2.4 V, and 2.1 to 2.2 V (FIG. 2). The relatively abrupt drop from about 3.0 volts to less than about 2.4 volts limits its applicability. Furthermore, it is known that the rechargeability of the $Li/V_2O_5$ system is very sensitive to the lower voltage limit.

Surprisingly, it has been found that when the discharge of $V_2O_5$-based cathodes is continued down to a certain voltage range, a structural change of the $V_2O_5$ takes place. This transformation results in an amorphous $V_2O_5$ which is lithiated and which, when used as the active material of a positive electrode, results in a battery having consistently high capacity and good charge/discharge characteristics. Preferably, the active material consists essentially of the amorphous vanadium pentoxide ($V_2O_5$) and/or lithiated amorphous vanadium pentoxide ($Li_xV_2O_5$). The amorphous $V_2O_5$ is prepared by electrochemically reacting crystalline vanadium pentoxide ($V_2O_5$) with lithium in a cell to a voltage below about 2.0 V, desirably, to a voltage of about 1.8 V or less and, preferably, to a voltage of about 1.5 V or less. Suitable voltage levels are in a range of about 1.5 V to about 2.0 V and, preferably, in a range of about 1.5 V to about 1.8 V. Preferably, the electrochemical reaction is conducted in a cell to a voltage in a range of about 1.5 V to about 1.8 V in a $V_2O_5$—Li cell at about room temperature and at a relatively constant current density, less than 1 milliamp per $cm^2$ of the electrode. Desirably, the current density is in a range of about 0.05 milliamps per $cm^2$ to about 0.5 milliamps per $cm^2$. The area used to derive current density is the surface area of one electrode which is the same as the active area of a cell or battery having an anode and a cathode. A broad range of temperatures around a typical 20° C. room temperature are suitable, such as 5° C. to 35° C.

Several methods may be used to form the crystalline $V_2O_5$ starting material. In one method, the crystalline $V_2O_5$ (vanadium pentoxide) is prepared from ammonium metavanadate ($NH_4VO_3$). The ammonium metavanadate is heated to a temperature of about 400° C. to about 450° C. to decompose it to crystalline $V_2O_5$ in the presence of oxygen. The crystalline $V_2O_5$ was used to prepare cells with lithium-based anodes. Several cells were prepared by mixing $V_2O_5$, carbon (typical Shawinigan black) and electrolyte/binder. A typical composition which was used for most of the experiments is as given in Table 1.

TABLE 1

| Typical Cathode Composition | Percent by Weight |
| --- | --- |
| $V_2O_5$ | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

The cathode was coated onto nickel foil followed by electron beam curing (cross-linking/polymerization) of the acrylate component. Then the electrolyte was coated on top of the cathode and cured with ultraviolet light. The lithium electrode was applied on top of the electrolyte separator and the battery was finally placed in a flexible pouch which was heat sealed under vacuum.

The crystalline $V_2O_5$ was converted to amorphous $V_2O_5$ by discharging each battery (cell) to about 1.5 V at room temperature. This yielded good results. However, the exact voltage level for the conversion is thought to be in a range of about 1.5 to about 2 V. The current density was about 0.25 $mA/cm^2$ of the electrode in most cases, but at higher densities, the conversion was also observed although, sometimes over a couple of cycles.

Figure 3:
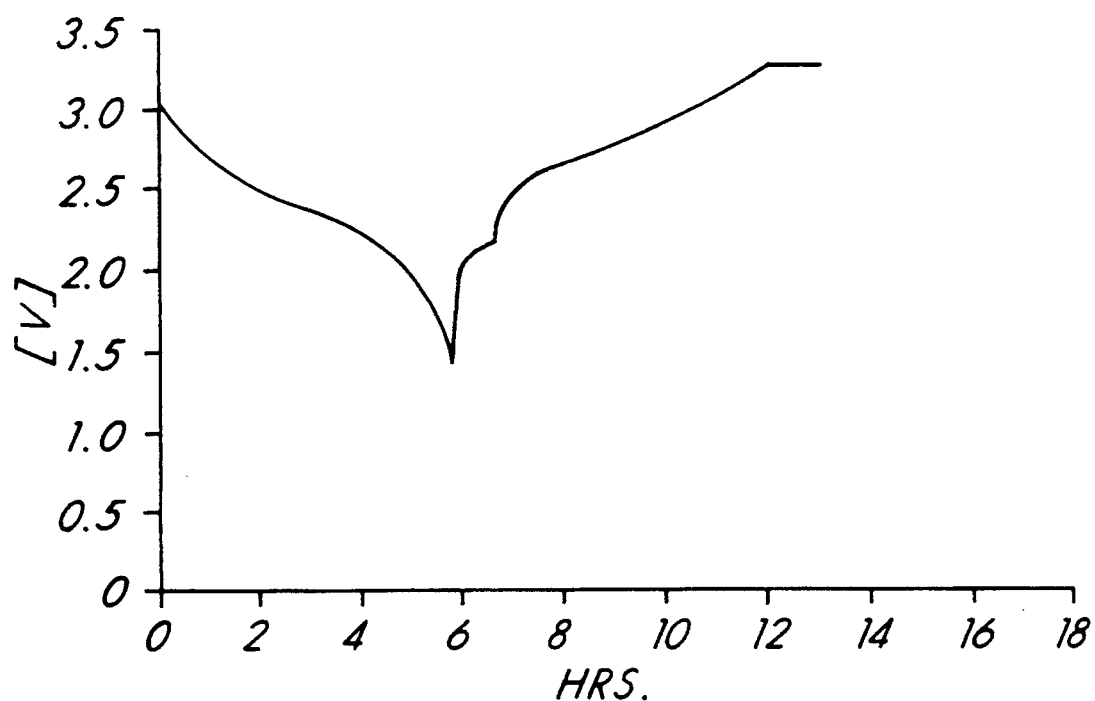
FIG. 3 is a voltage curve of the second discharge cycle of amorphous $V_2O_5$ cathode material of the invention, coupled with a metallic lithium anode.
Figure 4:
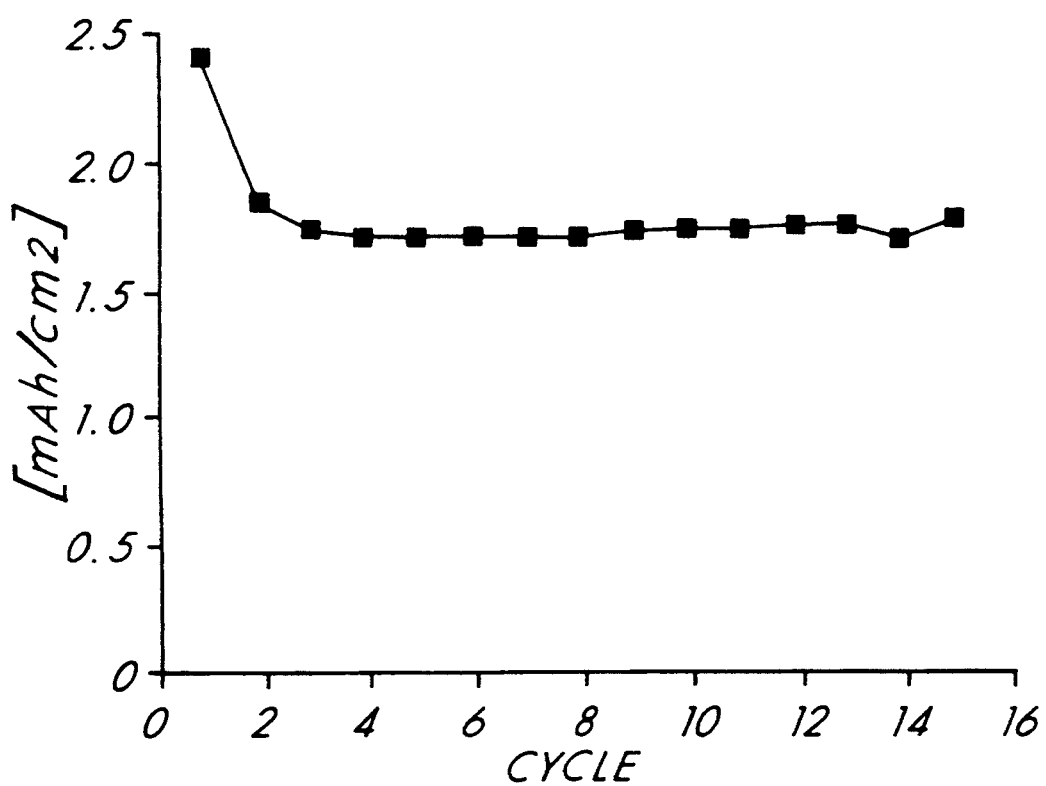
FIG. 4 is a curve showing the rechargeability of the amorphous $V_2O_5$ positive electrode active material of FIG. 3, demonstrated for a number of cycles.

The transformation from crystalline to amorphous $V_2O_5$ created a new, x-ray amorphous compound, which readily released at least a portion of inserted lithium. The transformation of the $V_2O_5$ created a rechargeable cathode (positive electrode) material with a high capacity. Furthermore, the discharge curve of the new material was smooth, featureless, and sloping as shown in FIG. 3. FIG. 3 is the second cycle of the battery of the invention having the new amorphous $V_2O_5$-based cathode of the invention. Voltage curves for the third and following cycles were obtained and found to be virtually identical. The rechargeability of the new material was good as demonstrated for multiple recharge cycles as shown in FIG. 4. Compared to crystalline $V_2O_5$, the rechargeable capacity of the amorphous $V_2O_5$ of the invention is higher and over-discharge is not a problem. In contrast, over-discharge of crystalline $V_2O_5$ destroys the battery.

It is possible to use lithium alloys in the cell, rather than metallic lithium, provided the voltage is adjusted accordingly. For example, in the case of LiAl, the voltage range would be 0.38 V lower than with pure lithium. Other alloys are $Li_xSi$, $Li_xBi$, $Li_xSn$, $Li_xPb$ and Woods (bismuth-cadmium) alloys. Also any other anode alternative to lithium, including lithium-containing compounds such as $Li_xC_6$, lithium containing organic redox polymers, and lithium insertion and intercalation materials may be used, provided the anode contains the lithium of the battery system, and the voltage requirement is observed, as described below. In such cases, the crystalline $V_2O_5$ is converted to amorphous $V_2O_5$ by discharging the batteries to less than about 1.5

V, and sometimes approaching 1.0 V. In any event, the transformation from crystalline to amorphous form of the $V_2O_5$ is thought to be achieved when a particular molar equivalent of Li is electrochemically reacted with crystalline $V_2O_5$.

Although not wishing to be held to any particular theory, it is thought that the following applies to the conversion of crystalline $V_2O_5$ to amorphous $V_2O_5$. This conversion is not so much determined by the voltage of the cell as by the lithium content of the $V_2O_5$. The amount of lithium which is needed to initiate the transformation is not well understood. In order to achieve good results, it is, therefore, easier to refer to and to monitor cell voltage using a relatively low current density. By this means, sufficient lithium is inserted in the $V_2O_5$ to achieve the desired results. The amount of lithium needed is thought to be more than 2 moles equivalent of Li+ per each mole equivalent of $V_2O_5$, but the transition from the crystalline to the amorphous state is thought to take place before 3 moles equivalent of Li+ per each mole equivalent of $V_2O_5$ is reached. There seems to be a very broad range. In the case of a current density less than about 1 $mA/cm^2$ of the electrode, it is possible to convert practically all crystalline $V_2O_5$ to the amorphous form by discharging very close to 1.5 V, when a pure lithium anode is used. With LiAl alloy, the voltage limit is about 1.1 V at the same current density. However, it is also possible to achieve the transition at higher current densities, but the conversion may take place over several discharge/charge cycles. In the case of an electrolyte with a relatively high conductivity, the same may be achieved in one cycle at the relatively high end of the current density range. While it is thought that lithium ions (Li+) are essentially inserted (intercalated) into the vanadium oxide, the mechanism is not well understood. Therefore, it is possible that cleavage of bonds of the host $V_2O_5$ may occur along with disturbance (perturbation) of bond arrangement of the host. As a result, the lithiated amorphous vanadium oxide of the invention may contain some lithium irreversibly bonded to the oxide as well as some lithium occupying sites within the oxide host without such bonding (essentially reversible insertion).

It is thought that the maximum amount of lithium which the lithiated $V_2O_5$ can intercalate is approximately equivalent to the general formula $Li_3V_2O_5$. It may be 5–10% higher, but it is unlikely; and it is even less likely to be equivalent to $Li_4V_2O_5$. Assuming a maximum of three moles equivalent of Li+ ions for each mole equivalent of $V_2O_5$ (i.e. 3 Li+ ions per each $V_2O_5$ atom; 3 Li+/$V_2O_5$), and referring to FIG. 4, the fully charged amorphous $Li_xV_2O_5$ contains lithium corresponding to $x=0.75$. The amount of x may be smaller under other charging conditions, but is the approximate amount which was left when a battery was cycled between 1.5 and 3.5 V at a current density of 0.25 $mA/cm^2$. Both charge and discharge occurred at room temperature.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A method of forming a positive electrode active material comprising electrochemically reacting crystalline vanadium pentoxide with lithium to a voltage below about 2 V to thereby provide lithiated amorphous vanadium oxide.

2. The method according to claim 1, wherein the voltage is in a range of about 1.5 V to about 1.8 V.

3. The method according to claim 2, wherein the source of lithium is metallic lithium.

4. The method according to claim 1, wherein the reaction is conducted at a relatively constant current in a range of about 0.05 milliamps per $cm^2$ to about 0.5 milliamps per $cm^2$.

5. The method according to claim 1, wherein the reaction is conducted at about room temperature.

6. The method according to claim 1, wherein the voltage is less than about 1.5 V and the source of lithium is at least one selected from the group consisting of metallic lithium, lithium alloys, and lithium-containing compounds.

7. A method of forming a positive electrode active material comprising electrochemically reacting crystalline vanadium pentoxide with lithium to a voltage sufficient to cause about 2 to about 3 moles equivalent of lithium atoms to react with each mole equivalent of the vanadium pentoxide thereby providing lithiated amorphous vanadium pentoxide.

8. The method according to claim 7, wherein the reaction is conducted at about room temperature.

9. The method according to claim 7, wherein the electrochemical reaction is at least in part conducted by inserting the lithium in ionic form into the vanadium oxide.

10. The method according to claim 1 wherein more than 2 moles equivalent of lithium are reacted with each mole equivalent of vanadium pentoxide.

11. The method according to claim 10 wherein up to about 3 moles equivalent of lithium are reacted.

12. A positive electrode having an active material comprising lithiated vanadium pentoxide characterized in that said pentoxide is amorphous and releases at least a portion of the lithium while retaining its amorphous character.

13. The electrode according to claim 12, wherein the amorphous pentoxide is prepared with more than about 2 moles equivalent of atoms of the lithium for each mole equivalent of the vanadium pentoxide.

14. The electrode according to claim 12 wherein the active material is prepared in situ in a cell by electrochemical reaction between crystalline vanadium pentoxide and lithium.

15. The electrode according to claim 12 which in a reduced, fully or partially discharged state corresponds to amorphous $Li_xV_2O_5$ with $x>2$.

16. The electrode according to claim 12 which in an oxidized, fully or partially charged state corresponds to amorphous $Li_xV_2O_5$ with $x<2$.

17. A positive electrode having an active material comprising an amorphous vanadium pentoxide having more than about 2 moles equivalent of lithium atoms inserted therein for each mole equivalent of vanadium pentoxide, said pentoxide further characterized by an ability to release at least a portion of the more than 2 moles of the inserted lithium while retaining its amorphous character.

18. The electrode according to claim 17 which in an oxidized, fully or partially charged state corresponds to amorphous $Li_xV_2O_5$ with $x<2$.

19. The electrode according to claim 17 which in a reduced, fully or partially discharged state corresponds to amorphous $Li_xV_2O_5$ with $x>2$.

20. A positive electrode having an active material containing lithiated amorphous vanadium pentoxide of the general formula $Li_xV_2O_5$ which in a reduced, fully or partially discharged state corresponds to the amorphous $Li_xV_2O_5$ with $x>2$.

21. The positive electrode according to claim 20 which in an oxidized, fully or partially charged state corresponds to amorphous $Li_xV_2O_5$ with $x<2$.

22. A rechargeable lithium battery which comprises: a negative electrode having an active material comprising lithium; a non-aqueous electrolyte comprising a lithium salt; and a positive electrode having an active material containing lithiated amorphous vanadium pentoxide formed by electrochemical reaction between crystalline vanadium pentoxide and lithium with more than about 2 moles equivalent of atoms of the lithium for each mole equivalent of the vanadium pentoxide.

* * * * *